(12) United States Patent
Bloomquist et al.

(10) Patent No.: US 8,699,651 B2
(45) Date of Patent: Apr. 15, 2014

(54) METHOD AND SYSTEM FOR SIMULTANEOUS IRRADIATION AND ELUTION CAPSULE

(75) Inventors: Bradley Bloomquist, Wilmington, NC (US); Jennifer Bowie, Leland, NC (US); David Grey Smith, Leland, NC (US); William Earl Russell, II, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1076 days.

(21) Appl. No.: 12/385,665

(22) Filed: Apr. 15, 2009

(65) Prior Publication Data

US 2010/0266083 A1  Oct. 21, 2010

(51) Int. Cl.
  *G21K 5/08* (2006.01)
(52) U.S. Cl.
  USPC .......................................... 376/202
(58) Field of Classification Search
  USPC .................................. 376/202, 189
  See application file for complete search history.

(56) References Cited

U.S. PATENT DOCUMENTS

| | | | | |
|---|---|---|---|---|
| 3,594,275 | A | * | 7/1971 | Ransohoff et al. ............ 376/158 |
| 3,940,318 | A | * | 2/1976 | Arino et al. ..................... 205/48 |
| 3,998,691 | A | * | 12/1976 | Shikata et al. ................. 376/169 |
| 4,160,910 | A | * | 7/1979 | Thornton et al. ....... 250/432 PD |
| 4,196,047 | A | * | 4/1980 | Mitchem et al. .............. 376/202 |
| 4,284,472 | A | * | 8/1981 | Pomares et al. .............. 376/186 |
| 4,352,735 | A | * | 10/1982 | Turetsky ....................... 210/238 |
| 4,462,956 | A | * | 7/1984 | Boiron et al. ................. 376/287 |
| 4,475,948 | A | * | 10/1984 | Cawley et al. .................. 75/230 |
| 4,493,813 | A | * | 1/1985 | Loriot et al. .................. 376/409 |
| 4,532,102 | A | * | 7/1985 | Cawley ......................... 376/185 |
| 4,597,936 | A | * | 7/1986 | Kaae ............................. 376/411 |

(Continued)

FOREIGN PATENT DOCUMENTS

| | | |
|---|---|---|
| EP | EA007452 B1 * | 10/2006 |
| EP | EA 007452 B1 | 10/2006 |

(Continued)

OTHER PUBLICATIONS

European Search Report issued in connection with corresponding EP Application No. 10159636, May 4, 2011.

(Continued)

*Primary Examiner* — Jack W Keith
*Assistant Examiner* — Sean P Burke
(74) *Attorney, Agent, or Firm* — Harness, Dickey & Pierce, PLC (57) ABSTRACT

A capsule for holding, irradiating, and eluting a material is provided. Methods of fabricating and using the capsule are also provided. The capsule may include a multidiameter tube with a first end region, a second end region, and a middle region. Washers and filters are provided in the end regions and the end regions may be sealed using various methods and materials with the end caps press fit into the end regions. The middle region is designed to store a material to be irradiated by a neutron flux source. The capsule components may be made from materials having a low nuclear cross section so that the capsule may be handled safely after an irradiation step is performed. The capsule is also designed to have a symmetric configuration as an elution and irradiation column so that the same capsule may be used to elute the material within the middle region of the capsule after an irradiation step is performed.

8 Claims, 10 Drawing Sheets

(56) References Cited

U.S. PATENT DOCUMENTS

| | | | |
|---|---|---|---|
| 4,617,985 A * | 10/1986 | Triggs et al. | 165/272 |
| 4,663,111 A * | 5/1987 | Kim et al. | 376/185 |
| 4,729,903 A * | 3/1988 | McGovern et al. | 427/5 |
| 4,782,231 A * | 11/1988 | Svoboda et al. | 423/249 |
| 4,859,431 A * | 8/1989 | Ehrhardt | 250/432 PD |
| 5,053,186 A * | 10/1991 | Vanderheyden et al. | 376/189 |
| 5,145,636 A * | 9/1992 | Vanderhevden et al. | 376/189 |
| 5,355,394 A * | 10/1994 | van Geel et al. | 376/189 |
| 5,400,375 A * | 3/1995 | Suzuki et al. | 376/435 |
| 5,513,226 A * | 4/1996 | Baxter et al. | 376/170 |
| 5,596,611 A * | 1/1997 | Ball | 376/189 |
| 5,615,238 A * | 3/1997 | Wiencek et al. | 376/202 |
| 5,633,900 A * | 5/1997 | Hassal | 376/189 |
| 5,682,409 A * | 10/1997 | Caine | 376/202 |
| 5,758,254 A * | 5/1998 | Kawamura et al. | 423/2 |
| 5,867,546 A * | 2/1999 | Hassal | 376/202 |
| 5,871,708 A * | 2/1999 | Park et al. | 424/1.25 |
| 5,874,811 A * | 2/1999 | Finlan et al. | 315/502 |
| 5,910,971 A * | 6/1999 | Ponomarev-Stepnoy et al. | 376/189 |
| 6,056,929 A * | 5/2000 | Hassal | 423/249 |
| 6,160,862 A * | 12/2000 | Wiencek et al. | 376/202 |
| 6,192,095 B1 * | 2/2001 | Sekine et al. | 376/189 |
| 6,233,299 B1 * | 5/2001 | Wakabayashi | 376/202 |
| 6,456,680 B1 * | 9/2002 | Abalin et al. | 376/189 |
| 6,678,344 B2 * | 1/2004 | O'Leary et al. | 376/170 |
| 6,751,280 B2 * | 6/2004 | Mirzadeh et al. | 376/189 |
| 6,804,319 B1 * | 10/2004 | Mirzadeh et al. | 376/189 |
| 6,895,064 B2 * | 5/2005 | Ritter | 376/194 |
| 6,896,716 B1 * | 5/2005 | Jones, Jr. | 75/396 |
| 7,157,061 B2 * | 1/2007 | Meikrantz et al. | 423/2 |
| 7,235,216 B2 * | 6/2007 | Kiselev et al. | 422/159 |
| 2002/0034275 A1 * | 3/2002 | Abalin et al. | 376/189 |
| 2002/0104273 A1 * | 8/2002 | Trpkovski | 52/172 |
| 2003/0012325 A1 * | 1/2003 | Kernert et al. | 376/202 |
| 2003/0016775 A1 * | 1/2003 | Jamriska et al. | 376/195 |
| 2003/0084879 A1 * | 5/2003 | Treusch et al. | 123/456 |
| 2003/0103896 A1 * | 6/2003 | Smith | 424/1.11 |
| 2003/0179844 A1 * | 9/2003 | Filippone | 376/208 |
| 2004/0091421 A1 * | 5/2004 | Aston et al. | 424/1.11 |
| 2004/0105520 A1 * | 6/2004 | Carter | 376/268 |
| 2004/0196942 A1 | 10/2004 | Mirzadeh et al. | |
| 2004/0196943 A1 * | 10/2004 | Di Caprio | 376/190 |
| 2005/0105666 A1 * | 5/2005 | Mirzadeh et al. | 376/198 |
| 2005/0118098 A1 * | 6/2005 | Vincent et al. | 424/1.11 |
| 2006/0062342 A1 * | 3/2006 | Gonzalez Lepera et al. | 376/195 |
| 2006/0126774 A1 * | 6/2006 | Kim et al. | 376/202 |
| 2007/0133731 A1 * | 6/2007 | Fawcett et al. | 376/202 |
| 2007/0133734 A1 * | 6/2007 | Fawcett et al. | 376/438 |
| 2007/0217959 A1 * | 9/2007 | Balestracci et al. | 422/102 |
| 2007/0297554 A1 * | 12/2007 | Lavie et al. | 376/190 |
| 2008/0031811 A1 * | 2/2008 | Ryu et al. | 424/1.11 |
| 2008/0076957 A1 * | 3/2008 | Adelman | 600/8 |

FOREIGN PATENT DOCUMENTS

| | | |
|---|---|---|
| GB | 1085640 A * | 12/1964 |
| GB | 1085640 A | 10/1967 |
| RU | 2267180 C2 * | 12/2005 |
| RU | 2267180 C2 | 12/2005 |
| RU | 2190269 C1 | 10/2006 |
| RU | 2190269 C1 * | 10/2006 |
| WO | WO 2007149108 A2 * | 12/2007 |

OTHER PUBLICATIONS

Translation of Russian Office Action dated Aug. 19, 2013 for corresponding Russian Application No. 2010114666.

* cited by examiner

METHOD AND SYSTEM FOR SIMULTANEOUS IRRADIATION AND ELUTION CAPSULE

BACKGROUND

1. Field

The invention relates to a capsule and methods of fabricating and using the capsule. The capsule is designed to fit within a nuclear reactor's neutron flux so that a material within the capsule may be irradiated in the reactor's core. The capsule is further designed to be used straight from the neutron flux source and used as an elution column to remove ions from within the capsule that were generated by the irradiation decay process.

2. Description of the Related Art

Technetium-99m (m is metastable) is a radionuclide used in nuclear medical diagnostic imaging. Technetium-99m is injected into a patient which, when used with certain equipment, is used to image the patient's internal organs. However, technetium-99m has a halflife of only six (6) hours, therefore, readily available sources of technetium-99m are desired.

A method for obtaining technetium-99m uses a minimum of a two-step process. First, titanium molybdate is placed in a capsule, which is then irradiated in a nuclear reactor. Molybdenum-98 within the titanium molybdate absorbs a neutron during the irradiation process and becomes molybdenum-99 (Mo-99). Mo-99 is unstable and decays with a 66-hour halflife to technetium-99m (m is metastable). After the irradiation step, the irradiated titanium molybdate is removed from the capsule and placed in a column for elution. Subsequently, saline is passed through the irradiated titanium molybdate to remove the technetium-99m ions from the irradiated titanium molybdate.

SUMMARY

At least one example embodiment relates to an elution capsule. In accordance with the example embodiment, an elution capsule may include a tube with a first end portion having a first inside diameter, a second end portion having a second inside diameter, and a middle portion between the first end portion and the second end portion having an inside diameter smaller than the inside diameters of the first and second end portions. The interface between the first end portion and the middle portion forms a first shoulder and the interface between the second end portion and the middle portion forms a second shoulder. The elution capsule may also include a first washer inside the first end portion contacting the first shoulder, a first filter inside the first end portion contacting the first washer, and a second filter inside the first end portion such that the first filter is between the first washer and the second filter. The first end may be sealed by a first end cap. The elution capsule may also include a second washer inside the second end portion contacting the second shoulder, a third filter inside the second end portion contacting the second washer, and a fourth filter inside the second end portion such that the third filter is between the second washer and the fourth filter. The second end portion may be sealed by a second end cap.

In accordance with at least one example embodiment, a method of irradiating a material within an elution capsule is disclosed. In accordance with the example embodiment, the elution capsule may include a tube with a first end portion having a first inside diameter, a second end portion having a second inside diameter, and a middle portion having an inside diameter smaller than the inside diameters of the first and second end portions. The middle portion is between the first end portion and the second end portion and is configured to hold the material. The interface between the first end portion and the middle portion forms a first shoulder and the interface between the second end portion and the middle portion forms a second shoulder. A first washer may be inside the first end portion and may contact the first shoulder. A first filter may be inside the first end portion and may contact the first washer. A second filter may be inside the first end portion and may be positioned such that the first filter is between the first washer and the second filter. A first end cap may be provided in the first end portion to seal-off the first end portion. A second washer may be inside the second end portion and may contact the second shoulder. A third filter may be inside the second end portion and may contact the second washer. A fourth filter inside the second end portion may be provided such that the third filter is between the second washer and the fourth filter. A second end cap may be provided in the second portion to seal-off the second end portion. The method, according to the example embodiment, may include placing the sealed elution capsule, with the material in the middle portion of the elution capsule in a neutron flux source and irradiating the capsule and its contents in the reactor's core.

At least one example embodiment related to a method of eluting a material enclosed in a sealed elution capsule is provided. The method includes placing the sealed elution capsule enclosing the material into a nuclear reactor, irradiating the sealed elution capsule and material in a reactor, removing the sealed elution capsule and irradiated material from the reactor, and performing an elution step by puncturing a first end portion of the elution capsule with a needle to supply a solution to the elution capsule and puncturing a second end portion with a needle to provide a vacuum to draw the solution through the irradiated material to collect the eluant.

BRIEF DESCRIPTION OF THE DRAWINGS

Example embodiments of the present invention will be more clearly understood from the following detailed description taken in conjunction with the accompanying drawings.

DETAILED DESCRIPTION OF THE EXAMPLE EMBODIMENTS

Example embodiments of the invention will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Figure 1:
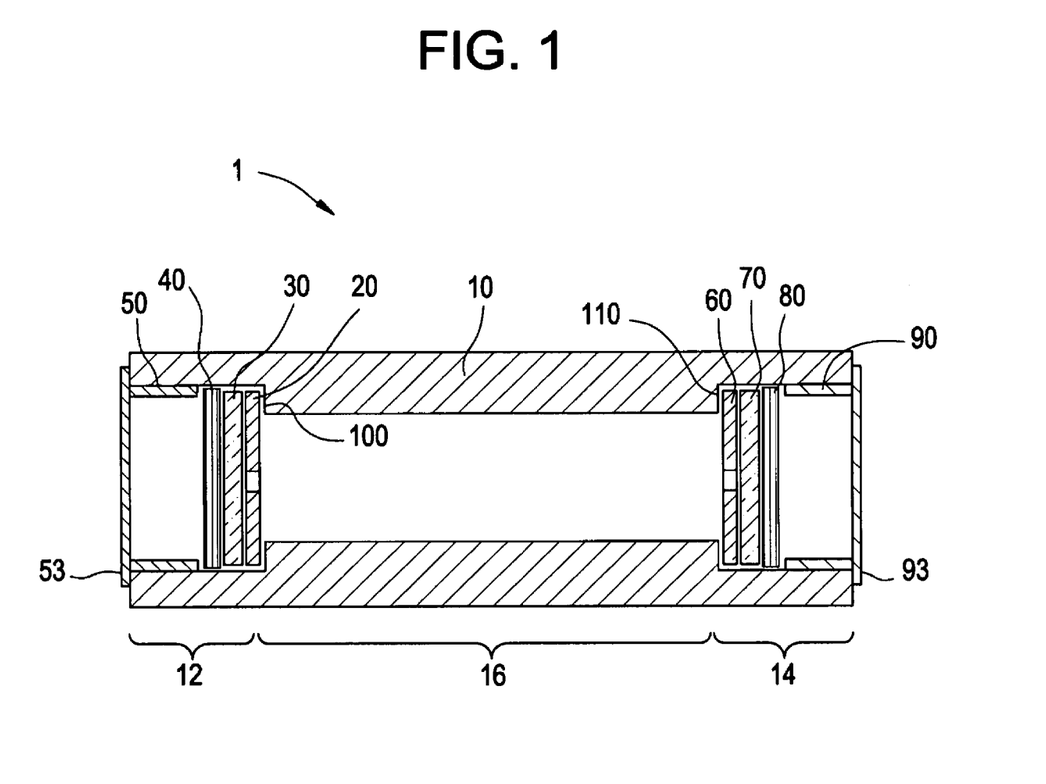
FIG. 1 is a section view of an irradiation/elution capsule in accordance with an example embodiment of the present invention.
Figure 2:
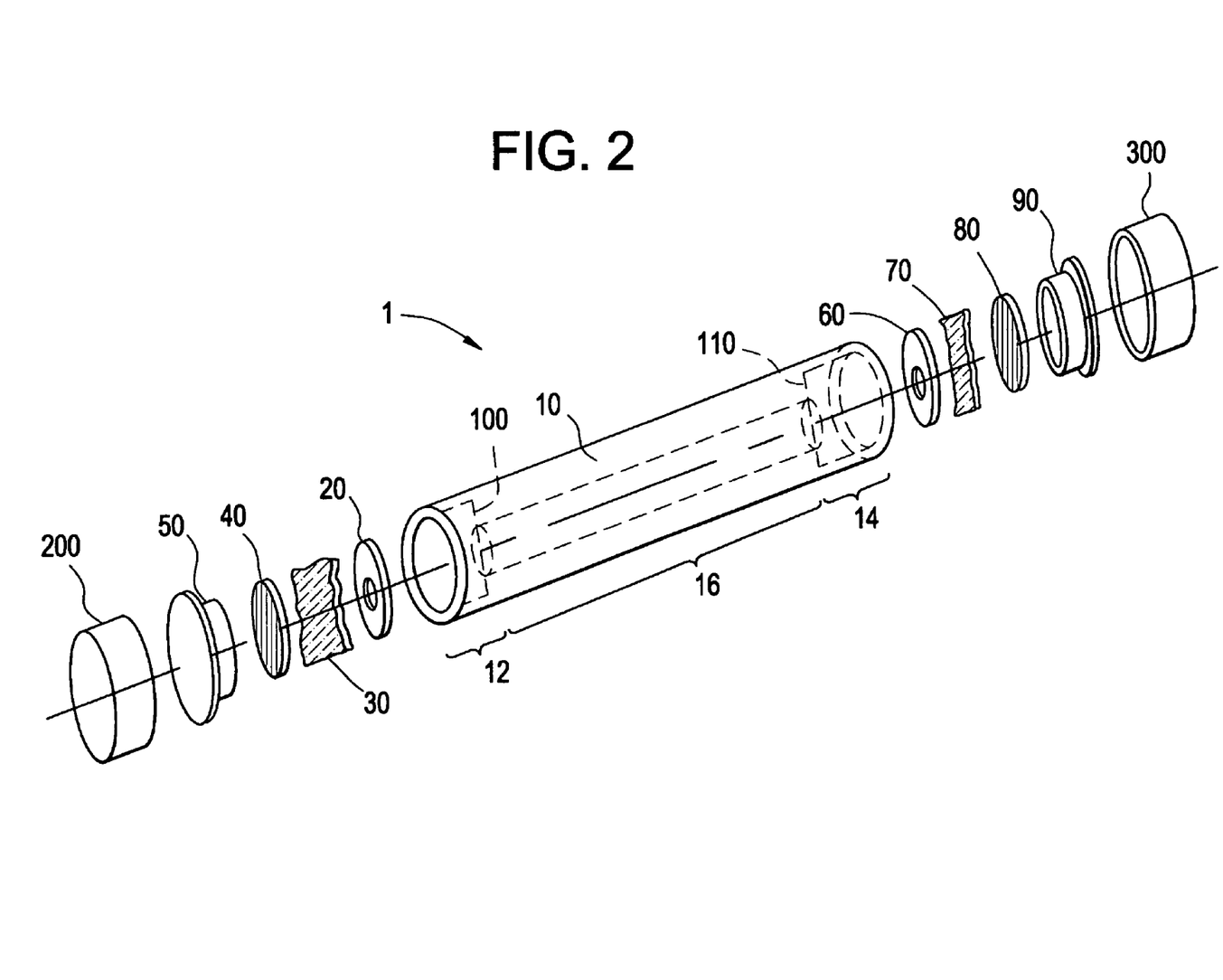
FIG. 2 is an exploded view of an irradiation/elution capsule in accordance with an example embodiment of the present invention.
Figure 3:
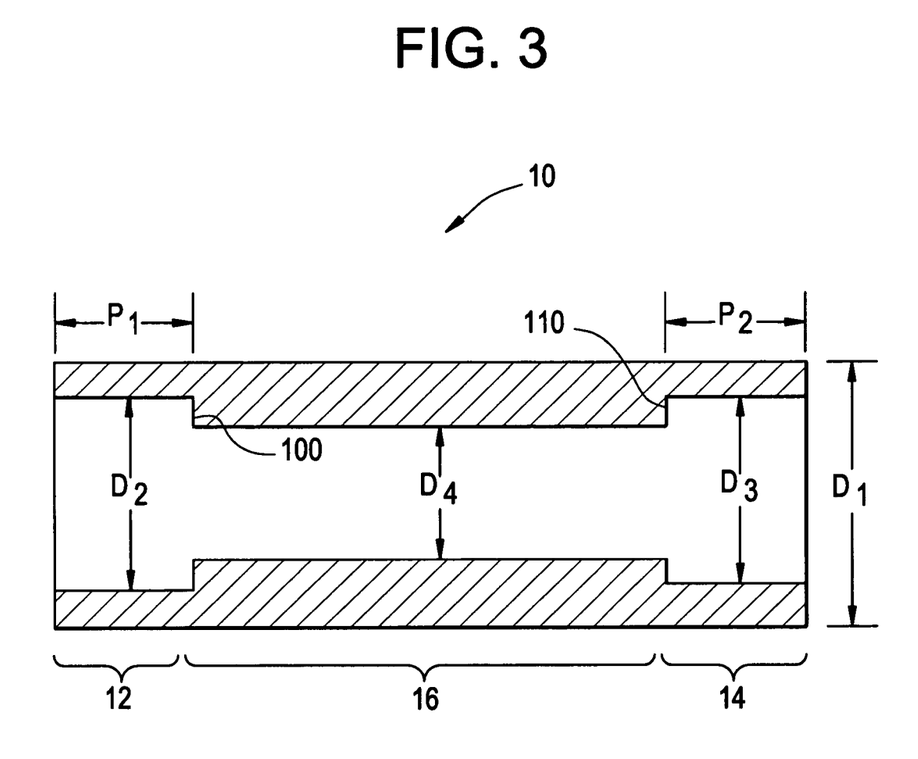
FIG. 3 is a section view of a multidiameter tube used in an irradiation/elution capsule in accordance with an example embodiment of the invention.
Figure 4:
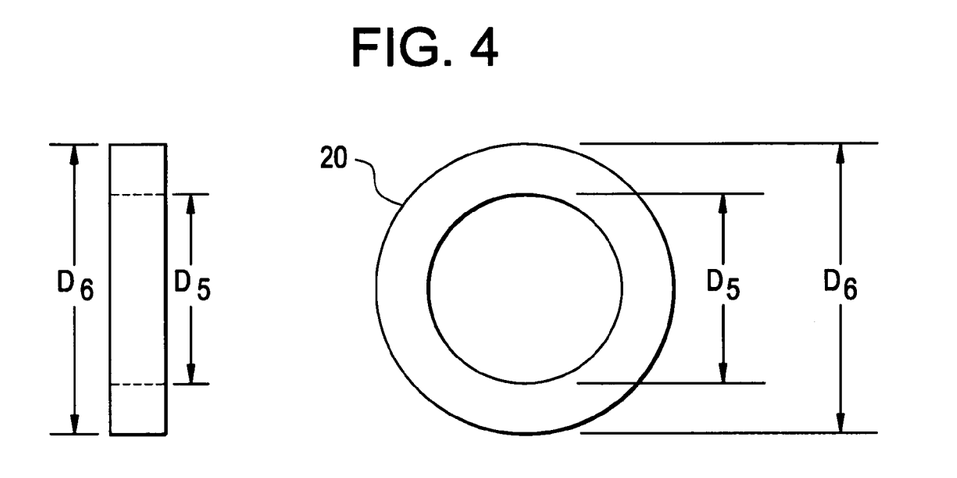
FIGS. 4 and 5 are plan views of washers used in an example irradiation/elution capsule in accordance with an example embodiment of the invention.
Figure 5:
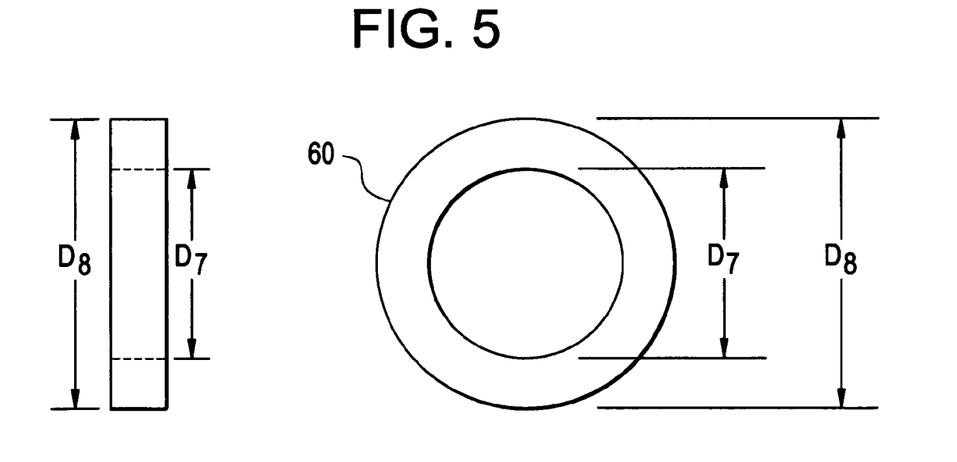
Figure 6:
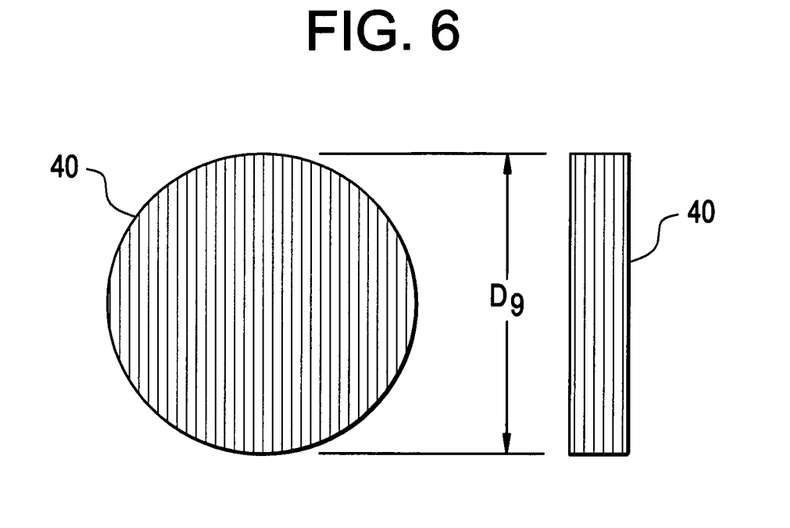
FIGS. 6 and 7 are plan views of filters used in an example irradiation elution capsule in accordance with an example embodiment of the invention.
Figure 7:
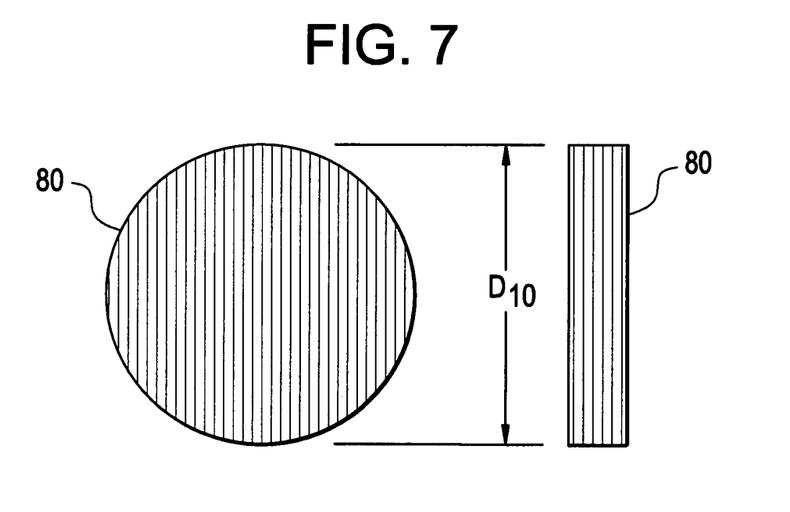
Figure 8:
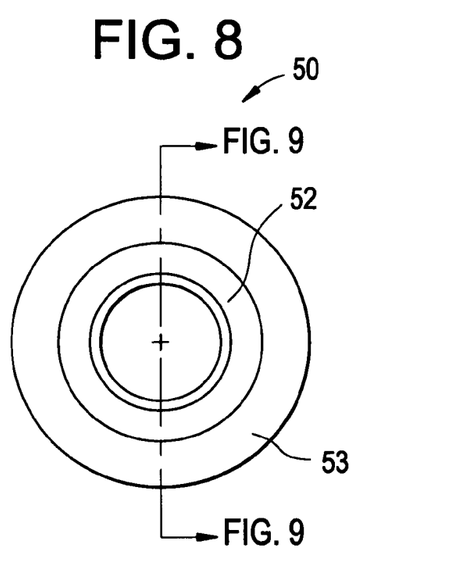
FIGS. 8-13 are views of end caps used in an irradiation/elution capsule in accordance with an example embodiment of the invention.
Figure 9:
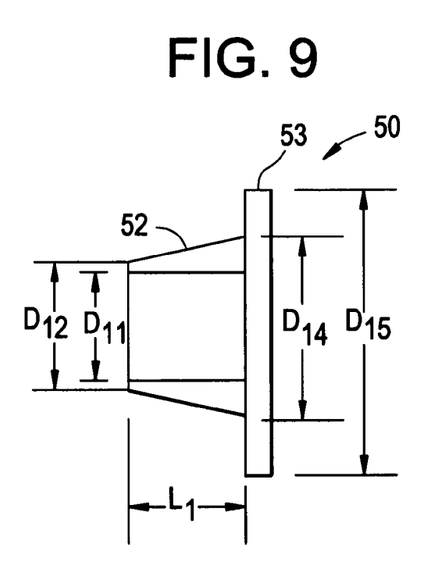
Figure 10:
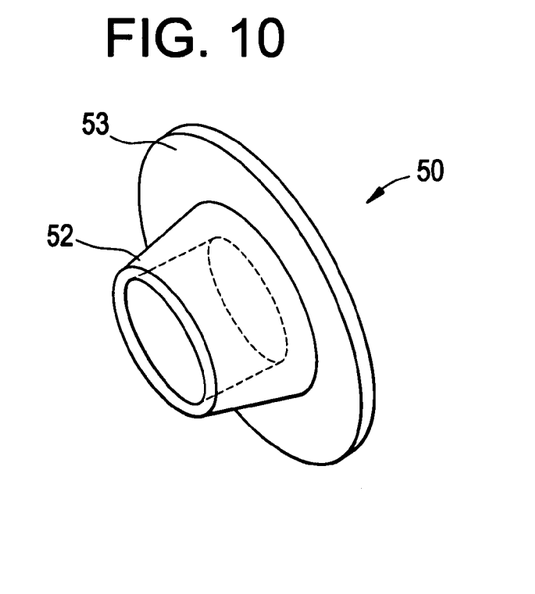
Figure 11:
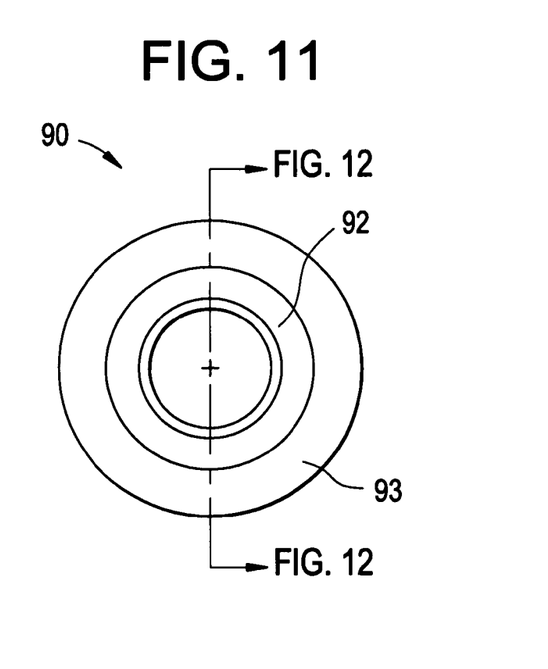
Figure 12:
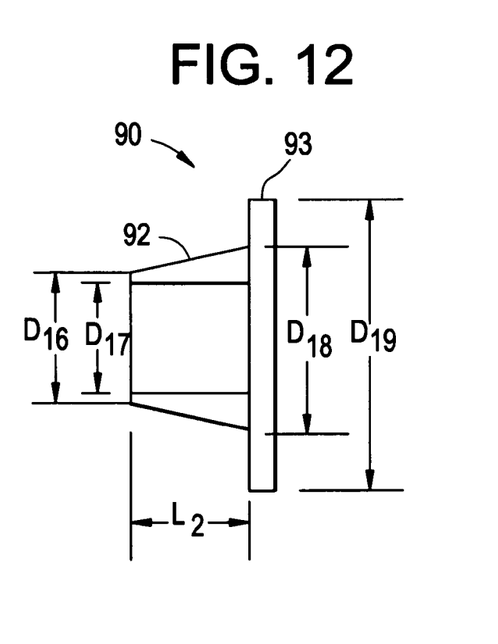
Figure 13:
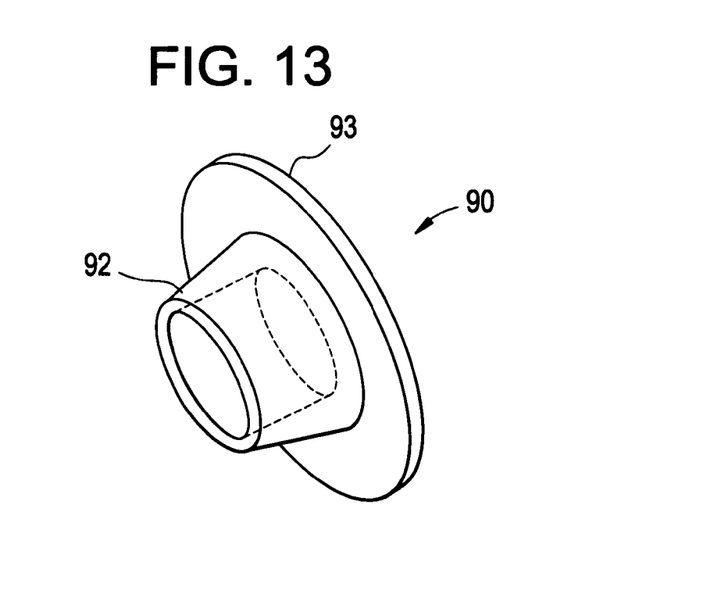

FIGS. 1-3 represent an example embodiment of the present invention. The example embodiment, as shown in FIGS. 1-3, includes a hollow cylindrically shaped multidiameter tube 10. The tube 10 is hollow such that a cross-section of the multidiameter tube has an annular shape. The tube 10 has a constant outer diameter D1, however, the inner diameter of the tube 10 varies along the length of the tube 10. For example, the tube, as shown in FIG. 1, includes three portions: a first end portion 12 located at one end of the multidiameter tube 10, a second end portion 14 located at another end of the multidiameter tube 10, and a middle portion 16 between the first end portion 12 and the second end portion 14. In this example embodiment of the invention, the inner diameter D4 of the middle portion 16 may be smaller than the inner diameters D2 and D3 of the end portions 12 and 14. In addition, the inner diameter of the first end portion D2 and the inner diameter of the second end portion D3 may be equal.

The first end portion 12 and the second end portion 14 may have lengths P1 and P2, respectively. As shown in FIG. 3, the lengths P1 and P2 may be equal. The interface between the first end portion 12 and the middle portion 16 forms a first shoulder 100 and the interface between the second end portion 14 and the middle portion 16 forms a second shoulder 110. Because the lengths P1 and P2 may be equal and because the diameters D2 and D3 may likewise be equal, the multidiameter tube 10 illustrated in FIGS. 1-3 may have a symmetric configuration.

The example capsule 1 for holding, irradiating and eluting a material in accordance with FIGS. 1-3 also includes first and second washers 20 and 60 positioned inside the first end portion 12 and the second end portion 14, respectively. The washers 20 and 60, as shown in FIGS. 1, 2, 4 and 5, are short hollow cylinders with annular cross-sections. The washer 20 has an outside diameter D6 larger than the inside diameter D4 of the middle portion 16 and smaller than the inside diameter D2 of the first end portion 12. The washer 20 has an inside diameter D5 that may be smaller, equal to, or larger than the diameter of the inside diameter D4 of the middle portion 16. The washer 60 has an outside diameter D8 larger than the inside diameter D4 of the middle portion 16 and smaller than the inside diameter D3 of the second end portion 14. The washer 60 has an inside diameter D7 that may be smaller, equal to, or larger than the diameter of the inside diameter D4 of the middle portion 16. As shown in FIGS. 1-2, the washer 20 is placed inside the first end portion 12 and against the shoulder 100. The washer 60 is placed in the second end portion 14 and against the shoulder 110.

The example capsule 1 for holding, irradiating, and eluting a material may also include first and second filters 30 and 40 in the first end portion 12 and third and fourth filters 70 and 80 in the second end portion 14 of the multidiameter tube 10. The first filter 30 may be placed in the first end portion 12 such that the washer 20 is between the first filter 30 and the shoulder 100 and the second filter 40 may be placed in the first end portion 12 such that the first filter 30 is between the second filter 40 and the washer 20. The third filter 70 may be placed in the second end portion 14 such that the washer 60 is between the third filter 70 and the shoulder 110 and the fourth filter 80 may be placed in the second end portion 14 such that the third filter 70 is between the fourth filter 80 and the washer 60.

The first through fourth filters may be made of various materials. For example, the first filter 30 and the third filter 70 may be made from glass wool. The glass wool may be made from a borosilicate or quartz glass. The second filter 40 and the fourth filter 80, may be circular glass frits as shown in FIGS. 1, 2, and 6-7 which resemble short cylinders or disks. The glass frits may be made from various materials such as borosilicate glass, quartz glass, polyethylene, resin, or some other material that will structurally support a material within the elution tube and act as a filter to prevent material from traversing down a flow path through the elution tube. The circular glass frit 40 has an outer diameter D9 smaller than the inner diameter D2 of the first end portion 12 but greater than the inner diameter D5 of the washer 20. The circular glass frit 80 has an outer diameter D10 smaller than the inner diameter D3 of the second end portion 14 but larger than the inner diameter D7 of the washer 60. Although circular glass frits are used as second and fourth filters 40 and 80, the invention is not limited thereto.

The example capsule 1 for holding, irradiating, and eluting a material may also include end caps 50 and 90 configured to seal the first end portion 12 and the second end portion 14 of the multidiameter tube 10, respectively. In accordance with the example embodiment illustrated in FIGS. 1-2, the end caps 50 and 90 may include tapered hollow cylindrical body parts 52 and 92 with covers 53 and 93 as shown in FIGS. 1, 2 and 8-13, allowing the end caps 50 and 90 to be press fit into the first and second end portions 12 and 14 of the multidiameter tube 10. Because the ends of the multidiameter tube 10 are sealed by press fitting the end caps 50 and 90 into the first and second end portions 12 and 14, the end caps 50 and 90 should be made from a soft material which will accommodate yielding during the press fit process. For example, the end caps may be made of aluminum.

The hollow cylindrical body part 52 may be tapered so that the outer diameter D12 of a portion of the hollow cylindrical body part 52 facing the center of the multidiameter tube 10 is smaller than an outer diameter D14 of the hollow cylindrical body part 52 attached to the cover 53. The diameter D12 must be smaller than the inner diameter D2 of the first end portion 12 of the multidiameter tube 10 so that the end of the hollow body part 52 facing the center of the multidiameter tube 10 may enter the first end portion 12. However, the outer diameter D14 of the cylindrical body part 52 attached to the cover 53 should be slightly larger than the inner diameter D2 of the first end portion 12 of the multidiameter tube 10 so that when the end cap 50 is press fit into the first end portion 12 of the multidiameter tube 10 the first end portion is sealed. Additionally, the inner diameter D1 of the hollow body part 52 should be smaller than the diameter D9 of the frit 40 to prevent the frit 40 from passing into the hollow body part 52.

The length L1 of the hollow body part 52 should be long enough to accommodate a needle which may be passed through the cover 53 during an elution process. The length L1 of the hollow body part 52, therefore, should be at least as long as the needle used to introduce or remove a liquid into or from the example capsule 1 for holding, irradiating, and eluting a material. Because the length L1 of the hollow body part 52 is at least as long as the aforementioned needle, the hollow body part protects the first and second filter from being damaged by the needle as the needle is introduced into the capsule.

The cover 53 of the end cap 50 has a diameter D15 larger than the inner diameter D2 of the first end portion 12 of the multidiameter tube to prevent the end cap 50 from completely passing into the first end portion 12. Because the cover 53 acts as a stop, the first and second filters 30 and 40 may be protected from being crushed by the hollow body 52 of the end cap 50 during the press fit process. Additionally, the cover 53 of the end cap 50 should be thin enough to allow puncture by a needle used in an elution process.

The hollow cylindrical body part 92 may be tapered so that the outer diameter D16 of a portion of the hollow cylindrical body part 92 facing the center of the multidiameter tube 10 is smaller than an outer diameter D18 of the hollow cylindrical body part 92 attached to the cover 93. The diameter D16 must be smaller than the inner diameter D3 of the second end portion 14 of the multidiameter tube 10 so that the end of the hollow body part 92 facing the center of the multidiameter tube 10 may enter the second end portion 14. However, the outer diameter D18 of the cylindrical body part 92 attached to the cover 93 should be slightly larger than the inner diameter D3 of the second end portion 14 of the multidiameter tube 10 so that when the end cap 90 is press fit into the second end portion 14 of the multidiameter tube 10 the second end portion 14 forms a mechanical seal. Additionally, the inner diameter D17 of the hollow body part 92 should be smaller than the diameter D10 of the frit 80 to prevent the frit 80 from passing into the hollow body part 92.

The length L2 of the hollow body part 92 should be long enough to accommodate a needle which may be passed through the cover 93 during an elution process. The length L2 of the hollow body part 92, therefore, should be at least as long as the needle used to introduce or remove a liquid into or from the example capsule for holding, irradiating, and eluting a material. Because the length L2 of the hollow body part 92 is at least as long as the aforementioned needle, the hollow body part 92 protects the third and fourth filters 70 and 80 from being damaged by the needle as the needle is introduced into the capsule.

The cover 93 of the end cap 90 has a diameter D19 larger than the inner diameter D3 of the second end portion 14 of the multidiameter tube 10 to prevent the end cap 90 from completely passing into the second end portion 14. Because the cover 93 acts as a stop, the third and fourth filters 70 and 80 may be protected from being crushed by the hollow body 92 of the end cap 90 during the press fit process. Additionally, the cover 93 of the end cap 90 should be thin enough to allow puncture by a needle used in an elution process.

An adhesive may be applied to the outer surfaces of the hollow body parts 52 and 92 before the end caps 50 and 90 are press fit into the first and second end portions 12 and 14. The adhesive may provide additionally sealing to prevent materials in the capsule from escaping.

Figure 14A:
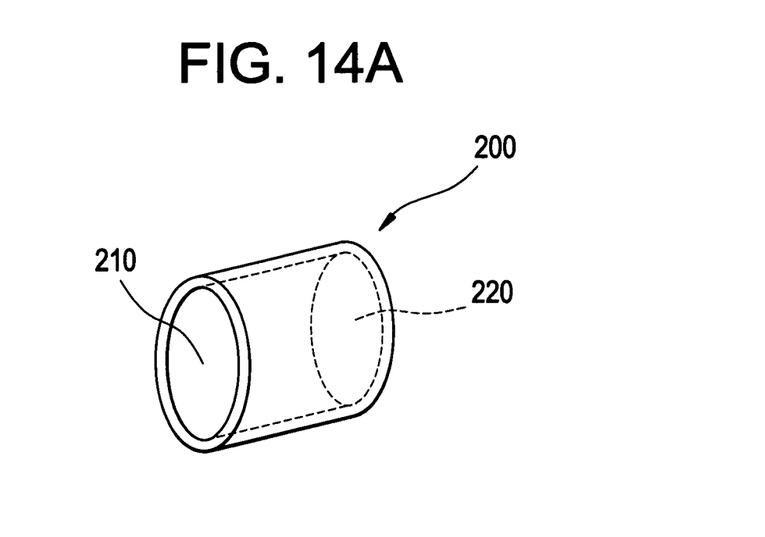
FIG. 14 are views of a seals for sealing the ends of an example irradiation/elution capsule in accordance with an example embodiment of the invention
Figure 14B:
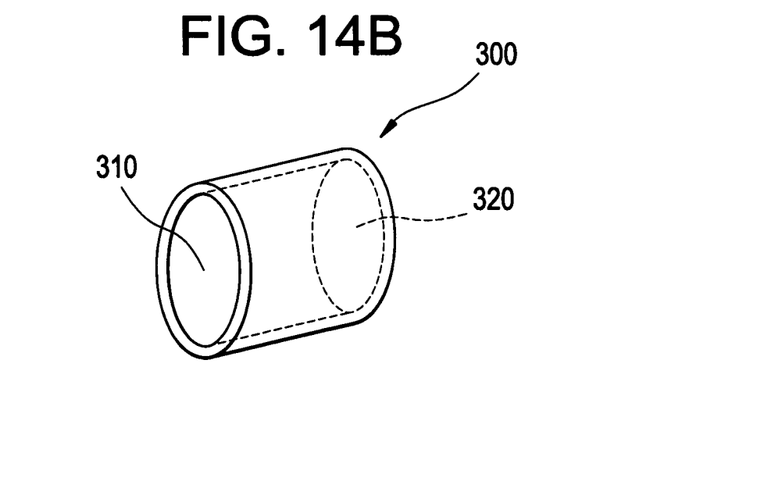

The example capsule 1 for holding, irradiating, and eluting a material may also include a first and second seals 200 and 300 for covering the end caps 50 and 90 after the end caps 50 and 90 have been press fit into the first and second end portions 12 and 14, respectively. Examples of the seals 200 and 300 are illustrated in FIG. 14. The first and second seals include a hollow cylindrical body parts 210 and 310 and are closed at one end by end parts 220 and 320. The seals may be made from a flexible material, for example, a non-hardening rubber, so that the seals 200 and 300 can be snug fit over the first and second end portions 12 and 14 to create a second seal. The end parts 220 and 320 of the seals 200 and 300 must be thin enough to allow puncture by a needle used in an elution process. Additionally, the seals 200 and 300 may be epoxied onto the ends of the multidiameter tube 10 by applying epoxy to the inner surfaces of the cylindrical body parts 210 and 310 before the seals 200 and 300 are fitted over the first and second end portions of 12 and 14. The epoxy applied to the inner surfaces of the cylindrical body parts 210 and 310 may provide an extra seal to prevent materials within the capsule 1 from escaping.

The multidiameter tube 10, the end caps 50 and 90, and the washers 20 and 60, should be made from materials that have a low nuclear cross section to avoid absorbing neutrons. Examples of such materials include zirconum, quartz, aluminum or alloys including zirconium, quartz, glass and aluminum. For example, the multidiameter tube 10, end caps 50 and 90, and the washers 20 and 60, may be made from zircaloy-2 or alternatively from aluminum 6061, high purity aluminum, and 4N and 5N aluminum.

Materials having low nuclear cross section are readily available from manufacturers and are often provided as bar stock. For example, cylinders of zirconium are readily available.

The multidiameter tube 10 may be fabricated by implementing a series of boring operations on a solid cylinder, for example, a solid cylinder of zirconium. The cylinder may have an outer diameter D1 and a length. The length of the cylinder may be determined based on the size of the nuclear reactor in which the cylinder will be irradiated and/or the size of a generator used in an elution process. A center of the cylinder may be bored out to a diameter of D4 transforming the solid cylinder into a hollow cylindrical tube. The hollow cylindrical tube may have a constant annular cross section with an inner diameter D4 and an outer diameter D1.

One end of the hollow tube may have the diameter increased by a second boring operation to form a first end portion 12 having a length of P1 and an inner diameter of D2. A second end of the hollow tube may likewise have the diameter increased by a third boring operation to form a second end portion 14 having a length P2 and an inner diameter D3. The length P1 should be deep enough to accommodate the above described filters 30 and 40, the washer 20, and the hollow part 52 of the end cap 50. Likewise, the length P2 should be deep enough to accommodate the above described filters 70 and 80, the washer 60, and the hollow part 92 of the end cap 90. The second and third boring operations transform the hollow cylindrical tube into a hollow multidiameter cylindrical tube 10 (see FIG. 3). The first end portion 12 has an annular cross section with an inner diameter D2 and an outer diameter D1 and the second end portion 14 has an annular cross section with an inner diameter D3 and an outer diameter D1. The portion of the tube between the first end portion 12 and the second end portion 14 constitutes a middle portion 16 with an annular cross section having an inner diameter D4 and an outer diameter D1.

The depths P1 and P2 of the first end portion and the second end portion 12 and 14 of the multidiameter tube 10 by the second and third boring operations may be the same. In addition, the inner diameters D2 and D3 of the first and second end portions 12 and 14 may be the same. Accordingly, the multidiameter tube 10 may be fabricated to produce a symmetrical structure.

The washers 20 and 60 may be fabricated by processes similar to those used in making the multidiameter tube 10. Because the washers 20 and 60 may be made by the same process, the process for making washer 60 is omitted for the sake of brevity.

As a starting point, washers may be fabricated from a cylinder of zirconium having an outer diameter of D6 may be provided. The diameter D6 should be smaller than the diameter D2 associated with the first end portion 12 of the multidiameter tube 10. The cylinder may have a length that should be at least as long as a desired thickness for the washer. The cylinder may have the middle bored out to create a hollow tube. The tube has an annular cross section with an inner diameter D5 and an outer diameter D6 (see FIG. 4). An end portion of the tube may be cut along a cut line to form the washer 20 with a desired thickness.

The end caps 50 and 90 may be fabricated by processes similar to those used in making the multidiameter tube 10. Because the end caps 50 and 90 may be made by the same process, the process for making the end cap 90 is omitted for the sake of brevity.

As a starting point, end caps may be fabricated by a cylinder of zirconium having an outer diameter D14 may be provided. The diameter D14 should be larger than the diameter D2 of the first end portion 12 of the multidiameter tube 10 (see FIG. 3). The cylinder is slightly longer than a length of a needle used to introduce or remove saline solution into or from the capsule 1 during the elution process. The cylinder may be placed in a die which fixes a portion of the cylinder. A first force may be applied to one end of the cylinder to deform the end of the cylinder to create a cover 53. The cover has a diameter D15 larger than the diameter D14 of the cylindrical body 52.

After the cover 53 has been formed, a portion of the cylinder below the cover 53 may be bored out to create a hollow body portion. The hollow body portion resembles a circular tube having an annular cross section with an inner diameter D11 and an outer diameter D14. After the hollow body portion is formed, a second force may be applied laterally to the hollow body portion to deform the hollow body portion into a tapered shape. Application of the second force transforms the hollow body portion into a tapered hollow body 52. The end of the tapered hollow body 52 away from the cover 53 has an annular cross section having an inner diameter D11 and an outer diameter D12. The outer diameter D12 should be formed to be smaller than the inner diameter D2 of the first end portion 12 in order to allow the end cap 50 to enter into the first end portion 12.

Having fabricated the multidiameter tube 10, the washers 20 and 60, and the end caps 50 and 90 the capsule 1 may be assembled as shown in FIG. 2. The washer 20 may be placed into the first end portion 12 so that the washer 20 bears up against the first shoulder 100. A first filter 30, for example, glass wool made from borosilicate glass, may be placed in the first end portion 12 so that washer 20 is between the first filter 30 and the shoulder 100. A second filter 40, for example, a glass frit made of borosilicate glass, may be provided in the first end portion 12 so that first filter 30 is between the second filter 40 and the washer 20. The end cap 50 may be inserted and press fit into the first end portion 12 thus sealing the first end portion 12. An epoxy may be provided on the outer surfaces of the hollow body part 52 of the end cap 50 before the press fitting operation to provide an extra added sealing means.

Formation of the capsule is completed by sealing the second end. The washer 60 may be placed into the second end portion 14 so that the washer 60 bears up against the second shoulder 110. A third filter 70, for example, glass wool made from borosilicate glass, may be placed in the second end portion 14 so that washer 60 is between the third filter 70 and the shoulder 110. A fourth filter 80, for example, a glass frit made of borosilicate glass, may be provided in the second end portion 14 so that third filter 70 is between the fourth filter 80 and the washer 60. The end cap 90 may be inserted and press fit into the second end portion 14 thus sealing the second end portion 14. An epoxy may be provided on the outer surfaces of the hollow body part 92 of end cap 90 before the press fitting operation to provide an extra added sealing means.

In addition to the above steps for fabricating the example capsule 1, extra seals 200 and 300 (see FIGS. 2 and 14) may be provided and placed on the ends of the capsule 1 after the first and second end portions 12 and 14 are sealed. The seals 200 and 300 may be provided for an extra seal. These seals may be made from a flexible material such as rubber and may be fabricated to provide a snug fit over the end portions of 12 and 14, of the capsule 1. The seals may include hollow body parts 210 and 310 and cover parts 220 and 320. The cover parts 220 and 320 should be sufficiently thin to allow for puncture by a needle in an elution process. In addition, epoxy may be applied to the inside surfaces of the hollow body parts 210 and 310 before the seals 200 and 300 are placed on the end portions 12 and 14 to provide for extra means for sealing the end portions of 12 and 14, of capsule 1.

As disclosed, the example capsule 1 includes a multidiameter tube 10 with a first end portion 12, a second end portion 14, and a middle portion 16 between the end portion 12 and 14. When the tube is in use, the middle portion 16 holds a material for an irradiation process. For example, the middle portion 16 may hold titanium molybdate, zirconium molybdate, titanium tungstenate, zirconyl tungstenate, or other ion exchange resin/gel matrix for elution. The material, for example, may be added to the middle portion 16 after the first end portion 12 has been assembled and sealed by the end cap 50 as described above. After the material is added to the middle portion 16, the second end portion 14 may be assembled and sealed as described above.

Figure 15:
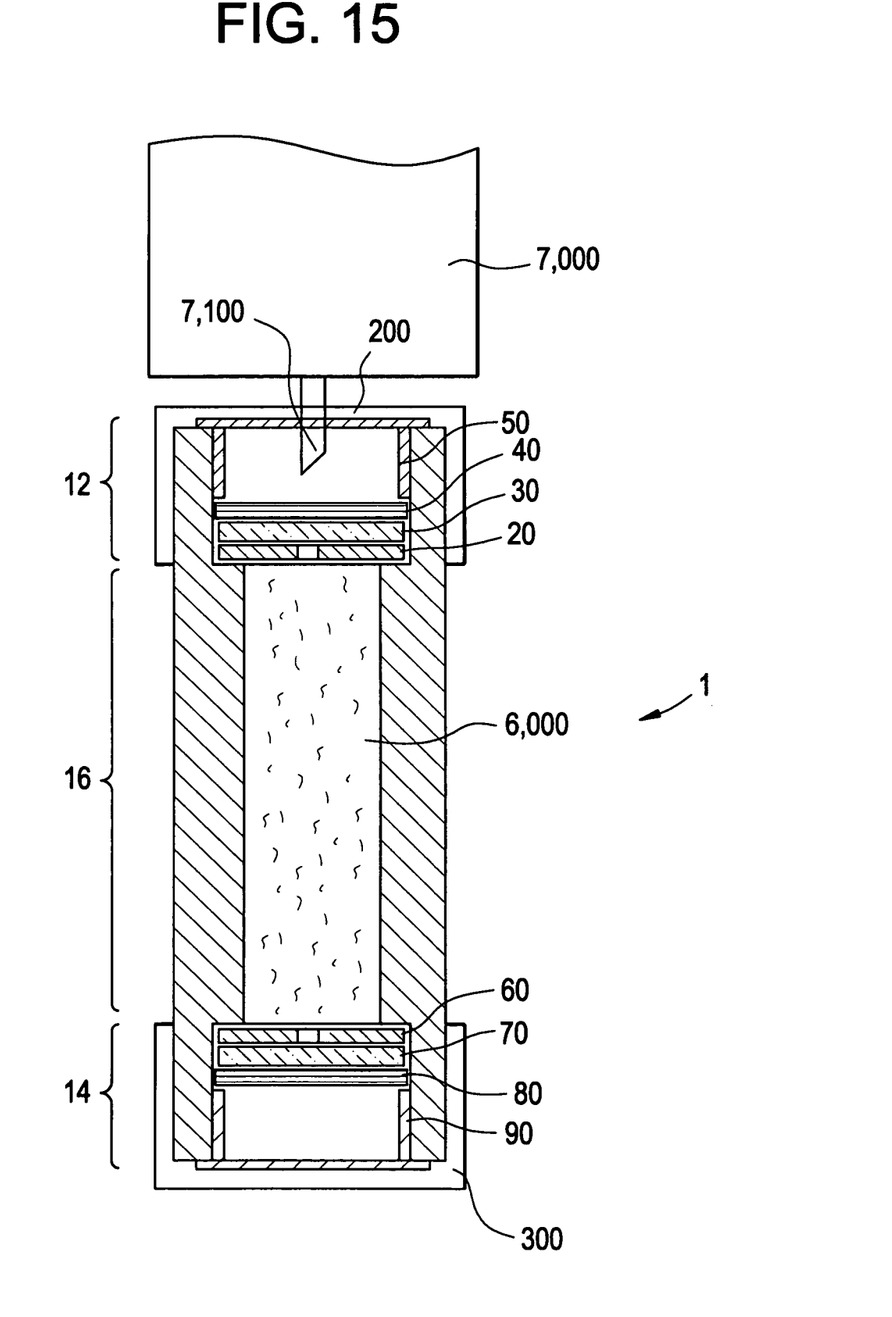
FIGS. 15-16 illustrate steps for using an irradiation/elution capsule in accordance with an example embodiment of the invention.
Figure 16:
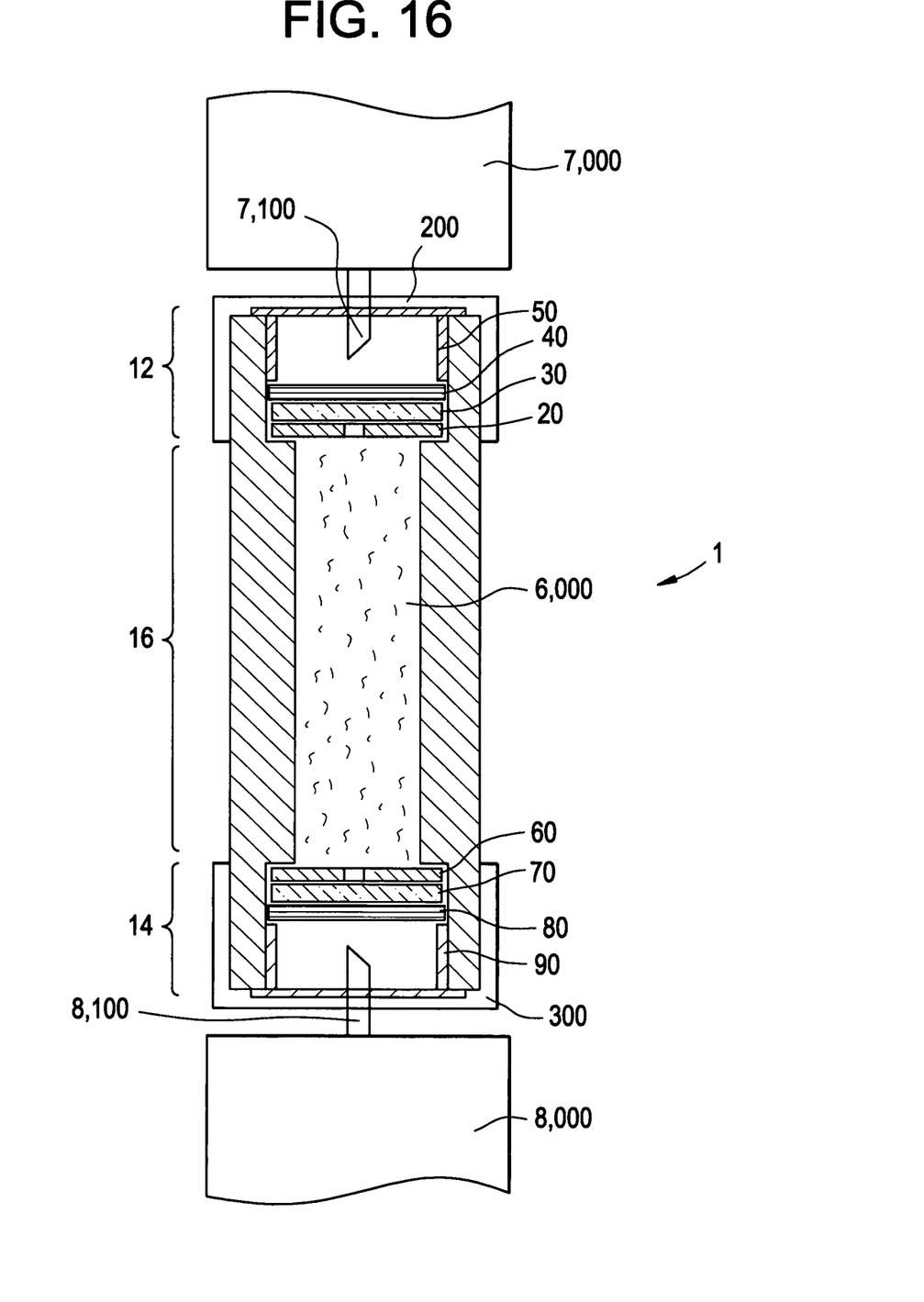

The sealed capsule 1 (without the seals 200 and 300) including the material to be irradiated may be irradiated in a nuclear reactor. After the irradiation step, the capsule may be removed from the reactor and the seals 200 and 300 may be fixed to the capsule as described above. Referring to FIGS. 15 and 16 a method of eluting the ions generated by the irradiation step and subsequent radioactive decay is described.

As shown in FIGS. 15 and 16, the capsule 1 includes an irradiated substance 6000. The elution process comprises two steps. The first step includes puncturing one end of the capsule 1 with a needle 7100 attached to a device 7000 for supplying a liquid, for example, distilled water, deionized water, saline, oxidizers, acids, bases, or any other water based solution, to the example capsule 1. As shown in FIG. 15, the seal 200 and the end cap 50 may be punctured by the needle 7100. However, because the length of the needle is shorter than the length of the hollow body portion 52, the first and second filters 30 and 40 of capsule 1, are not damaged by the needle. In order to draw the liquid through the irradiated substance 6000 as shown in FIG. 16, a needle 8100 attached to a vacuum system 8000, e.g. a vacuum bottle, punctures the end cap 90 and the seal 300. However, because the needle 8100 is shorter than the length of the hollow body 92 of the end cap 90, the third and fourth filters 70 and 80 of capsule 1, are not damaged by the needle 8100. The vacuum from the vacuum system 8000 draws the fluid from the device 7000, through the irradiated material 6000, and into the vacuum system 8000. Accordingly, ions generated during the irradiation decay process may be collected in the vacuum system 8000.

While example embodiments have been particularly shown and described with reference to example embodiments thereof, it will be understood by those of ordinary skill in the art that various changes in form and details may be made therein without departing from the spirit and scope of the following claims.

What is claimed:

1. A method of irradiating a material in an elution capsule, the elution capsule including,
   a tube with a first end portion having a first inside diameter, a second end portion having a second inside diameter,
   a singular first opening in the first end portion and a singular second opening in the second end portion, the first and second openings facing opposing directions and being about collinear with a longitudinal centerline of the tube,
   a middle portion having an inside diameter smaller than the inside diameters of the first and second end portions,
   the middle portion being between the first end portion and configured to hold the material,
   an interface between the first end portion and the middle portion forms a first shoulder and an interface between the second end portion and the middle portion forms a second shoulder,
   a first washer inside the first end portion contacting the first shoulder,
   a first filter inside the first end portion contacting the first washer,
   a second filter inside the first end portion contacting the first filter, the first filter being located between the first washer and the second filter,
   a first end cap sealing the first opening,
   a second washer inside the second end portion contacting the second shoulder,
   a third filter inside the second end portion contacting the second washer,
   a fourth filter inside the second end portion contacting the third filter, the third filter being located between the second washer and the fourth filter, and
   a second end cap sealing the second opening, the method comprising:
   placing the material in the middle portion of the elution capsule;
   placing the elution capsule in a neutron flux source; and
   irradiating the capsule and the material in the neutron flux source.

2. The method of claim 1, wherein the material includes one of titanium molybdate, zirconium molybdate, titanium tungstenate, and zirconyl tungstenate.

3. A method of eluting a material comprising:
   placing a sealed elution capsule enclosing the material into a nuclear reactor, the elution capsule having first and second end portions with a singular, sealed first opening in the first end portion and a singular, sealed second opening in the second end portion, the first and second openings facing opposing directions and being about collinear with a longitudinal centerline of the elution capsule;
   irradiating the sealed elution capsule and the material in a reactor;
   removing the sealed elution capsule and irradiated material from the reactor; and
   performing an elution step by puncturing the first opening of the elution capsule with a needle to supply a solution to the elution capsule and puncturing the second opening with a needle to provide a vacuum to draw the solution through the irradiated material to collect the eluant.

4. The method of claim 3, further comprising:
   applying a first adhesive layer on an inner surface of a first flexible material that forms a seal over the first opening and a second adhesive layer on an inner surface of a second flexible, material, that forms a seal over the second opening.

5. The method of claim 3, wherein the material is one of titanium molybdate, zirconium molybdate, titanium tungstenate, and zirconyl tungstenate and the solution is one of distilled water, deionized water, saline, oxidizers, acids, or bases.

6. The method of claim 3, wherein the sealed elution capsule includes a multidiameter tube with the first end portion having a first inside diameter, the second end portion having a second inside diameter, and a middle portion between the first end portion and the second end portion having an inside diameter smaller than the inside diameters of the first and second end portions, wherein an interface between the first end portion and the middle portion forms a first shoulder and an interface between the second end portion and the middle portion forms a second shoulder.

7. The method of claim 6, further comprising:
   placing a first washer inside the first end portion to contact the first shoulder;
   placing a first filter inside the first end to contact the first washer;

placing a second filter inside the first end such that the first filter is between the first washer and the second filter;

applying epoxy to a first end cap;

inserting the first end cap in the first end portion to seal the first opening;

placing the material into the middle portion of the multidiameter tube, wherein the material enters the middle of the multidiameter tube from the second end portion;

placing a second washer inside the second end portion to contact the second shoulder;

placing a third filter inside the second end portion to contact the second washer;

placing a fourth filter inside the second end portion such that the third filter is between the second washer and the fourth filter; and applying epoxy to a second end cap;

inserting the second end cap in the second end portion to seal the second opening;

applying epoxy to internal surfaces of a first non-hardening flexible seal;

placing the first non-hardening flexible seal over the first opening after the irradiation step to form an extra seal for sealing the first opening of the capsule;

applying epoxy to internal surfaces of a second non-hardening flexible seal; and placing the second non-hardening flexible seal over the second opening after the irradiation step to form an extra seal for sealing the second opening of the capsule.

8. The method of claim 2, further comprising:

removing the elution capsule from the neutron flux source;

eluting the elution capsule using a solution that is one of distilled water, deionized water, saline, oxidizers, acids or bases.

\* \* \* \* \*